(12) United States Patent
Patel et al.

(10) Patent No.: US 8,263,689 B2
(45) Date of Patent: Sep. 11, 2012

(54) WATER-BASED ADHESIVES FOR INDUSTRIAL APPLICATIONS

(75) Inventors: Nalini Patel, Langley (GB); Rebecca Stopps, London (GB); Christophe Magnin, Lantignie (FR)

(73) Assignee: Henkel AG & Co. KGaA, Duesseldorf (DE)

( * ) Notice: Subject to any disclaimer, the term of this patent is extended or adjusted under 35 U.S.C. 154(b) by 639 days.

(21) Appl. No.: 12/066,733

(22) PCT Filed: Sep. 5, 2006

(86) PCT No.: PCT/EP2006/008627
§ 371 (c)(1),
(2), (4) Date: Jun. 23, 2009

(87) PCT Pub. No.: WO2007/031211
PCT Pub. Date: Mar. 22, 2007

(65) Prior Publication Data
US 2009/0306255 A1      Dec. 10, 2009

(30) Foreign Application Priority Data
Sep. 14, 2005 (EP) .................................. 05020034

(51) Int. Cl.
*C08L 3/02* (2006.01)
(52) U.S. Cl. .......................................... 524/32; 524/53
(58) Field of Classification Search .............. 524/32, 524/53
See application file for complete search history.

(56) References Cited

U.S. PATENT DOCUMENTS

| 4,791,151 A | 12/1988 | Kowalski et al. |
| 5,087,649 A | 2/1992 | Wegner et al. |
| 6,245,853 B1 | 6/2001 | Tang et al. |
| 6,559,236 B1 | 5/2003 | Willimann et al. |
| 6,815,473 B2 | 11/2004 | Robert et al. |
| 2004/0266929 A1 | 12/2004 | Imai et al. |
| 2005/0031871 A1 | 2/2005 | Kinsho et al. |

FOREIGN PATENT DOCUMENTS

| CA | 2053914 A1 | 10/1990 |
| DE | 4006001 | * 8/1991 |
| DE | 4006001 A1 | 8/1991 |
| DE | 19725448 A1 | * 12/1998 |
| DE | 19908560 A1 | 10/1999 |
| EP | 0254467 A2 | 1/1988 |
| EP | 0393491 | 10/1990 |
| EP | 1038903 | 9/2000 |
| EP | 1454943 A1 | 9/2004 |
| JP | 200026823 A | 1/2000 |
| WO | WO9951699 | 10/1999 |
| WO | 0005275 A1 | 2/2000 |
| WO | WO0192401 | 12/2001 |
| WO | WO03004562 | 1/2003 |

* cited by examiner

*Primary Examiner* — Robert D. Harlan
(74) *Attorney, Agent, or Firm* — Sun Hee Lehmann

(57) ABSTRACT

The invention relates to water-based adhesives for industrial applications obtained by mixing water-redispersible polymer powder and water-soluble polymer powder with water, wherein the weight ratio of the water-redispersible polymer powder to the water-soluble polymer powder is from about 0.001:1 to 100:1 and the water-based adhesive has a set speed of less than 300 sec, when measured with a 36 μm thick layer at 23° C. and 50% relative humidity and 385 μm thick carton boards with a weight of 275+/−3 g/m2 and Cobb values on one side of 43 g/min/m2 and 27 g/min/m2 on the other side, has a solids content of about 7.5 to 70 wt.-% and a Brookfield viscosity at 23° C. at 20 rpm, measured according to the ASTM D1084 standard, of about 500 to 10,000 mPas. The water-based industrial adhesive has the capability to bond a low surface tension substrate to a cellulosic substrate, in particular with a weight-ratio of water-redispersible polymer powder to water-soluble polymer powder from about 0.5:1 to 100:1 thus can replace conventional aqueous adhesives based on synthetic polymer dispersions. The benefits of the invention are manifold such as faster set speeds and increased machine speeds, logistical advantages due to handling powders instead of liquids, leading to e.g. prolonged shelf life, no water transportation and being an environmentally friendly, low VOC containing adhesive.

10 Claims, No Drawings

WATER-BASED ADHESIVES FOR INDUSTRIAL APPLICATIONS

The invention relates to water-based adhesives for industrial applications obtained by mixing water-redispersible polymer powder and water-soluble polymer powder with water.

Water-based adhesives are widely used for many different application areas. For less critical substrates, such as porous, cellulose-based materials, often adhesives are used, which are based on modified or unmodified polysaccharides, such as cellulose ethers, starch ethers or unmodified starches. Such adhesives do impart a big advantage, since these polysaccharides are typically available in powder form. Thus, they do give all benefits associated with powders, such as e.g. being freeze thaw stable, having typically a longer shelf life due to no or significantly lower microbiological attack and transportation benefits, since no water needs to be shipped. In recent years, it has been found that modifying polysaccharide-based adhesives with synthetic polymer powders can give an advantage for systems being manually mixed and hand applied. This type of application such as wallpaper pastes or adhesives for posters is much less demanding than industrial applications, using typically high speed machines. For instance, solids contents are very low, typically 5 wt.-% or lower, the rheology being thixotropic with very high viscosities, e.g. up the 20,000 mPas or more. The adhesive is applied by hand using e.g. a brush, leading to a thickness of the applied adhesive of several millimetres or more. Since the substrates like walls, where such wallpapers are applied to, are fairly thick and porous, they can absorb the large amount of water to lead to reasonable drying times. In particular due to the application method and the thickness of the applied adhesive, it does not play a role if the powder particles do not redisperse fully, or if some coagulates are formed between the synthetic polymer particles and the polysaccharides, as long as they are smaller then the applied adhesive layer. The tack level of such hand applied adhesives is quite low, the setting needs to be slow to avoid wrinkles in paper, as well as the slip properties need to be good for repositioning the substrate. Furthermore, the accepted standard deviation of the various parameters is, compared to industrial adhesives, fairly large.

However, they cannot be used for demanding applications such as industrial applications, and/or for bonding difficult substrates, having typically a low surface tension such as bonding polyethylene foils to paper.

EP 311 873 A2 describes a process to manufacture a dry product suitable as paste base, which may be obtained by drying in a thin layer on a surface heated to 80 to 200° C. a mixture containing approximately 30 to 80 wt.-% water, 30 to 95 wt.-% of carboxymethylated and/or alkoxylated starch, 3 to 40 wt.-% of a cellulose ether, and 2 to 40 wt.-% of a water dispersible polymer or water-soluble polymer and optionally further additives. The dry products are particularly useful as wallpaper pastes. They are made up manually at low, e.g. 2 wt.-% solids. The made up pastes are typically applied by hand and impart therefore less critical requirements. Furthermore, the process to make the powdered mixture involves many additions and steps and is rather complex and difficult to control, since both, the polysaccharide as well as the synthetic polymers have to be brought together in order to be dried as a mixture. Furthermore, the drying conditions need to be controlled strongly in order to avoid any film-formation of the dispersible polymer during the drying step.

WO 9113121 relates to suitable dry mixtures for the production of aqueous adhesives consisting of methyl cellulose (I), carboxy methyl starch (II) and, if desired, synthetic resin redispersion powders and other auxiliaries. In order to easily separate the substrates of a dry adhesive joint made with the aqueous adhesive, the novel dry mixtures are distinguished by a mutual ratio of (I) to (II) in the range of 3:97 to 30:70. They are used to glue paper and other adsorbent cellulose materials, in particular wallpapers. The synthetic resin redispersion powders are just optional additives and are not suitable to bond difficult substrates, e.g. with a low surface tension. Additionally, the targeted application is typically hand applied, requiring less stringent features.

DE 197 25 448 A1 relates to the use of adhesives for posters in weather-influenced external sites of a mixture containing (A) a water-soluble polymer, which is preferably a polysaccharide derivative and (B) a non-water-soluble but water-dispersible polymer, which is preferably a polyvinyl acetate. The preferred composition comprises 1-99.5 wt. % carboxymethylcellulose, 8-12 wt. % redispersion powder and 0.1-1 wt.-% preservative. Powder adhesives for posters are mixed with water at low solids and hand applied and therefore is less critical to prepare due to lower demanding requirements, in particular regarding grits, consistent specifications regarding viscosity, solids, set speeds as well as rheology.

Adhesives for industrial applications, however, are much more demanding. The thickness of both, the adhesive as well as both substrates is most typically very low, e.g. just 20 to 50 microns. These adhesives need to be suitable to run on high speed machines, e.g. up to 1500 m per minutes or higher. Thus, the solids content is typically higher, e.g. up to 50% or higher to avoid large amounts of water to evaporate, at much lower viscosities, such as about 1000 to 5000 mPas. In order to enable such high machine speeds, the adhesive must allow defect free working, hence must be grit free and have the required rheology to avoid splashing or other defects within narrow standard deviations. The set speed needs to be quite fast, compared to hand applied systems. Besides the demanding requirements for machinability, such adhesives often need to bond also so-called "difficult" substrates, e.g. substrates having a low surface tension and are non-absorbent, like polystyrene windows in envelopes or polyethylene foils in bags. While commercial adhesives for industrial applications are optimised for the various applications, they are water-based, liquid adhesives, thus having the mentioned disadvantages of not being in powder form.

The object of the present invention was to propose a new water-based adhesive for industrial applications imparting all advantages of powder adhesives, but can be used as in many different, including very demanding applications as liquid adhesives, as well as being used on all different machines. Furthermore, they should have also additional technical advantages. In particular, the inventive adhesive shall, e.g. before mixing with water, have a very long shelf life, typically longer than liquid adhesives, but contain no or just small amounts of biocides or preservatives. The adhesive needs to be easily made up, thus the mixing of powders with water does not need to pose any problems, in particular no or just minor grit formation is accepted. It needs to be possible that with a small amount of raw materials a much larger number of different adhesives can be obtained easily. The obtained water based adhesive needs to have a fast set speed, a short open time to allow working with high speeds on the machines. By using this new inventive adhesive, it also should be possible that the machine speed can be increased compared to the state of the art adhesives, without compromising on any other factor. Thus, low standard deviations of the adhesive properties obtained with the inventive adhesive are key, as well as a defect free working is essential and an easier machine cleaning is preferred. Therefore, the adhesive also needs to have the required rheology to avoid any splashing. In order to be versatile in application, it must be possible to bond difficult-to-bond substrates, in particular substrates with low surface tensions, to cellulosic substrates as well as having no or just a minor cost impact, but ideally even reducing the costs of the applied adhesive. Additionally, the adhesive needs be environmentally friendly, thus having low levels of Volatile Organic Compounds.

It was now surprisingly found that all these objectives can be achieved by a water-based adhesive which is an aqueous mixture on the basis of a water-redispersible polymer powder and a water-soluble polymer powder and further optional components. The weight ratio of the water-redispersible polymer powder to the water-soluble polymer powder is from about 0.001:1 to 100:1 and the obtained water-based adhesive has a set speed of less than 300 sec, when measured with a 36 µm thick layer at 23° C. and 50% relative humidity and 385 µm thick carton boards with a weight of 275+/−3 g/m$^2$ and Cobb values on one side of 43 g/min/m$^2$ and 27 g/min/m$^2$ on the other side, the adhesive has a solids content of about 7.5 to 70 wt.-% and a Brookfield viscosity at 23° C. at 20 rpm (ASTM D1084 standard) of about 500 to 5000 mPas.

The water-redispersible polymer powder is a water insoluble, film-forming polymer made by suspension-, emulsion- and/or micro emulsion polymerisation or emulsified bulk polymers and can be homo- and/or copolymers. The term water insoluble means that at least 80 wt.-%, preferably at least 90 wt.-%, more preferably at least 95 wt.-% and in particular at least 98 wt.-% are water insoluble at 23° C. They can be one single type of product or a mixture of several products, including one or several emulsion polymers combined with one or several synthetic solution polymers and/or natural polymers. The polymers are typically, but not exclusively, based on at least one monomer selected from the group consisting of vinyl esters of $C_1$- to $C_{20}$-carboxylic acids such as vinyl acetate, vinyl propionate, vinyl butyrate, vinyl pivalate, vinyl 2-ethylhexanoate, vinyl laurate and vinyl versatates with up to 12 carbon atoms, such as VeoVa 9, VeoVa 10 and VeoVa 11, ethylene, vinyl chloride, $C_1$- to $C_{20}$-esters of acrylic or methacrylic acid, such as methyl(meth)acrylate, ethyl(meth)acrylate, butyl(meth)acrylate, 2-ethylhexyl (meth)acrylate, hydroxyethyl(meth)acrylate, derivatives of unsaturated dicarboxylic acids, such as $C_1$- to $C_{20}$-esters of itaconic acid, diisopropyl fumarate, dimethyl, methyl t-butyl, di-n-butyl, di-t-butyl and diethyl esters of maleic acid and fumaric acid, maleic anhydride, styrene and styrene derivatives as well as butadiene. Preferred monomers are vinyl acetate, ethylene, vinyl chloride, vinyl versatates, butyl acrylate, methyl methacrylate and combinations thereof.

The water-redispersible polymer powder is based on typical homopolymers and copolymers, including, but not restricted to, polyvinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth) acrylate, vinyl versatate-(meth)acrylate, all-(meth)acrylics, styrene-acrylate and/or styrene-butadiene copolymers.

These polymers may contain also functional monomers from about 0.01 to 20%, preferably from about 0.05 to 10% by weight, based on the overall weight of comonomer mixture. Functional monomers are well known to the expert and include, as non-limiting examples, vinyl and allyl type monomers containing carboxylic groups, amines, amides, nitriles, cyano- and/or N-methylol functionalised monomers such as cyanoethyl(meth)acrylate and N-methylol (meth)acrylamide, esters, ethers, thiols, sulfates, sulfonates, phosphates, N-vinyl functionalised monomers such as N-vinyl acetamide, carbamates, silanes and siloxanes, epoxides, glycidyl- and epihalohydrin-groups, cationic groups such as quarternary amines, anionic groups such as carboxylates, amphoteric monomers as well as monomers containing two or more copolymerizable groups such as divinyl adipate, diallyl maleate, triallyl cyanurate or divinyl benzene. Preferred functional monomers are glycidyl methacrylate, N-methylol acrylamide, N-methylol methacrylamide, vinyl sulfonate and vinyltriethoxy silane.

Preferred polymers are vinyl acetate homopolymers, copolymers of ethylene and vinyl acetate with ethylene contents of preferably about 1 to 60%, more preferably between about 5 and 25%, and/or Acrylates. The particles can be stabilized by one or more stabilizers such as modified and/or unmodified, fully and/or partially hydrolysed polyvinyl alcohol with degree of hydrolysis of preferably about 70 to 100, more preferably between about 80 and 98 and their derivatives, polyvinyl pyrrolidone with molecular weights of preferably about 2000 and 400,000, cationic or anionic stabilization systems obtained by monomers such water-soluble polymers obtained from poly(meth)acrylic acid, polyvinylsulfonic acid as well as stabilizing systems as described e.g. in EP-A 1098916, EP-A 1109838, Melaminformaldehydesulfonates, Naphthalinformaldehydesolufonates, Styrene maleic acid- and vinylether-maleic acid copolymers, cold-water-soluble polysaccharides such as cellulose, starch (amylose and amylopectine), guar, dextrines, which can be modified by e.g. carboxymethyl, carboxyethyl, hydroxyethyl, hydroxypropyl, methyl, ethyl, propyl and/or longer chain alkyl groups, alginates, peptides and/or proteins such as gelatine, casein and/or soja proteins. Preferred are partially or fully hydrolyzed polyvinyl alcohol, dextrines and/or hydroxyalkyl cellulose as particle stabilizers.

The water-redispersible polymer powder is widely water insoluble, thus it does redisperse in water. Upon water evaporation, it typically forms a film, which can be flexible and transparent or slightly hazy. To get full benefit in certain applications it can be advantageous that the minimum film formation temperature is around room temperature or above to get a strong and tough adhesion bond. Some other applications require a more flexible film, typically obtained with minimum film formation temperatures below room temperature, typically between about 0 to 10° C., preferably between about 0 and 5° C. Redispersion can occur with no or low mixing with water. However, for large scale production it often is helpful to apply shear forces upon mixing to aid fast redispersion. Water-redispersible powders having strong thickening properties, imparting typically a polymer or copolymer with a high glass transition temperature Tg of e.g. 50° C. or above, are less preferred as sole water-redispersible polymer powder, but can be used as thickener together with the other two polymer powders.

Water-soluble synthetic polymer powders are polymer powders with molecular weights of 1000 or more, in particular 2000 and more, as long as they dissolve in water to a transparent or slightly hazy solution, whereas the haziness generally arises from some impurities in the water-soluble polymer. In particular for dissolving synthetic polymers in water, applying heat and shear forces to the water containing the polymer powder can accelerate the dissolution process. Using synthetic polymer powders with smaller powder particle sizes typically aids the ease of dissolution, requiring no or less heating. Non-limiting examples of water-soluble synthetic polymer powders are polyvinyl pyrrolidone, preferably with a molecular weight of about 2000 to 400,000, more preferably between about 5000 and 200,000 and in particular between about 10,000 and 100,000, and/or modified or unmodified, partial or fully hydrolysed polyvinyl alcohol, with a degree of hydrolysis of about 70 to 100 Mol %, preferably between about 75 to 98 Mol %, in particular between about 82 and 92 Mol %, and a Höppler viscosity of a solution with 4 wt-% solids of about 1 to 50 mPas, preferably about 2 to 45 mPas, in particular between about 3 to 40 mPas (measured at 20° C. according to DIN 53015), or water-soluble polyacrylates.

Water-soluble natural polymer powders are physically and/or chemically modified or unmodified natural polymer powder, as long as they dissolve in water to a transparent or slightly hazy solution. Applying heat upon the dissolution is sometimes preferably, such as for cellulose ethers. For starches, for example, it is often a requirement to cook them in order to have a cold water-soluble product. This step is typically done separately, before drying the product to a powder. However, such a cooking step can also be part of the dissolution process, although it is less preferred. Non-limiting, selected examples of water-soluble natural polymer powders are modified or unmodified polysaccharides such as cellulose, starch (amylose and/or amylopectine), dextrines, guar, xanthan and welan gum, alginates, peptides and/or proteins such as gelatine, casein and/or soya proteins. They can be modified. However, it is often preferred that the polysaccharides are modified by e.g. carboxyalkyl-, hydroxyalkyl- and/or alkyl-groups, where the alkyl- is a linear or branched $C_1$- to $C_{20}$-alkyl chain, preferably $C_1$- to $C_4$-alkyl chain, or $C_1$- to $C_{20}$-alkyl succinimides. Preferred water-soluble natural polymer powders are cold water-soluble starch ethers, which can be e.g. hydroxyalkylated and/or modified with hydroxyl- and/or alkyl succinic anhydride, hydroxyethyl and/or methyl hydroxyethyl cellulose, dextrines, gelatine and/or casein, while in particular medium to high carboxylated water-soluble polymer powders, such as with a degree of substitution of about 0.05 and higher, in particular of about 0.1 and higher, are less preferred.

Water-redispersible polymer powders are typically obtained by spray drying, spray cooling and freeze drying, fluidized bed drying, flash drying, spray granulation, spray agglomeration. Typical methods to obtain water-soluble polymer powders include drum drying, product flocculation followed by filtration and subsequent drying, as well as solvent evaporation, followed by grinding. However, other means can be applied as well, as long as the product properties are kept.

The solids content of water-based adhesives is best expressed by the amount of non-volatiles or solids relative to the total amount of volatile or liquid and non-volatiles or solid portions, independent on the amount of air incorporated in the system. It preferably varies from 10 to 65% solids, more preferably from about 20 to 55%. It primarily depends on the solution characteristics in water of the particular polymers. For instance, non-ionic high molecular weight cellulose ethers increase viscosity already at low amounts as well as, but as drastic, starch ethers or high molecular weight polyvinyl alcohols. Thus, at higher amounts of such types of water-soluble polymer powders, lower solid contents are used, while at high amounts of water-redispersible polymer powder and/or ionic water-soluble polymer powders higher solid contents can be achieved at similar viscosities.

For industrial applications, water-based adhesives typically have viscosities of about 1000 to 5000 mPas at various solids. It depends primarily on the ratio and types of water-redispersible polymer powder and a water-soluble polymer powder, the solids content, the particle size obtained after redispersion of the redispersible polymer powder, further additives, as well as on the amount of gas incorporated in a possibly foamed adhesive. Furthermore, the temperature of the adhesive has also an influence on the viscosity.

By optimising the various parameters individually for each single application, the required product viscosities can be obtained, which are essential for applying the water-based adhesive. Thus, a viscosity of about 500 to 10,000 mPas, preferably of about 1000 to 7500 mPas, in particular of about 1500 to 5000 mPas, expressed as Brookfield viscosity measured at 23° C. and at 20 rpm, according to ASTM D1084 standard, can be obtained with solids contents of about 7.5 to 70%, preferably from about 10 to 65% and in particular from about 20 to 55%. The rheology of the water-based adhesive for industrial applications is shear thinning. It can range from being nearly Newtonian to strongly shear thinning. This feature can be optimised for the individual application by using particular water-redispersible polymer powders and/or water-soluble polymer powders, as well as adding rheology modifiers to adjust to the required properties.

It was surprisingly found that already small amounts of water-redispersible polymer powder added to the water-soluble polymer powder can have a significant impact. Furthermore, a small amount of water-soluble polymer powder added to the water-redispersible polymer powder can give a clear additional benefit of the performance of the obtained water-based adhesive for industrial applications. Thus, the weight ratio of water-redispersible polymer powder to water-soluble polymer powder can range from about 0.001:1 up to 100:1, in particular from about 0.01 to 50:1, and preferably from about 0.1 to 25:1.

The inventive water-based adhesive for industrial applications has a set speed at 23° C. and 50% relative humidity of less than about 300 sec, preferably less than about 200 sec, more preferably less than about 100 sec, and in particular less than 60 seconds, when measured with a 36 µm thick layer at 23° C. and 50% relative humidity and 385 µm thick carton boards with a weight of 275+/−3 g/m$^2$ and Cobb values on one side of 43+/−3 g/min/m$^2$ and 27+/−3 g/min/m$^2$ on the other side, whereas the Cobb values are determined using TAPPI standard T441M45.

It is of particular relevance for water-based adhesives used in industrial applications that the level of grits is very low, since the adhesive is applied in very thin layers, which are typically between about 20 to 50 µm. This thickness is further reduced e.g. by a factor of about two for adhesives with a solids content of about 50%. Hence, already fine agglomerates can cause e.g. strips when applied with a machine—or even block the outlet of the nozzle, leading to lengthy cleaning cycles. Upon drying, an applied adhesive with a lot of grits can give an uneven surface, even through a thin substrate like e.g. a cigarette paper. Although the inventive adhesive is based on powders, which are water-redispersible and water-soluble, it was surprisingly found that indeed no or only a very small amount of grit, compared to current, liquid water-based adhesives, is formed. This is attributed to both, an excellent redispersion of the polymer powder as well as a good compatibility of the water-redispersible and the water soluble polymer powders which do not form agglomerates or even coagulates during as well as after the redispersion and/or dissolution of the powders. The size of the grits can easily be determined either by microscopy or filtration. The filtration through a web with a given mesh size leads to the amount of grits, which is larger than the mesh size. A further method to determine the amount of grits is to look for strips caused by grits upon application, in particular upon roller applications. The applied thickness corresponds to the grit size and the frequency of strips observed, relative to the amount of adhesive used, leads to an estimated grit level. The inventive water-based adhesive for industrial application has an amount of grits which is lower than 10 ppm, preferably lower than 1 ppm, most preferably lower than 0.1 ppm and in particular lower than 0.01 ppm, based on the weight of the water-based adhesive and the size of grits is considered to be larger than about 50 µm, preferably larger than 35 µm and in particular larger than 25 µm.

The ease of bonding two substrates together depends strongly on the porosity and the surface tension of the substrates. Porous substrates are typically much easier to bond, since the adhesive can penetrate into the substrate, enabling a mechanical anchoring between the substrate and the dried adhesive. The water-based adhesive formulations of the invention may be used to bond one substrate to a second similar or different substrate. Porous substrates include paper and wood. As used herein "paper" means both paper and paperboard products, both single- and multi-ply (e.g., paper laminates, corrugated boards, solid fibers) sheets made from without limitation, Kraft paper, paper made from recycled fibers and the like. The term "wood" is meant to include wood composites and particle board and encompass chipboard, particleboard, medium density fibreboard, high density fibreboard, oriented strand board, hardboard, hardwood plywood, veneer core plywood, isocyanate or phenolic impregnated strawboard, and wood composites made from woodfiber and polymers, such as recycled polyethylene.

Adhesion to non-porous substrates relies on adhesive forces based on interactions of atoms and molecules only. If the surface tension of a substrate is high, also called a hydrophilic substrate, typically a standard adhesive can be used for bonding. However, for lower surface tension substrates, so called hydrophobic substrates, the adhesive needs to be formulated specifically in order to get proper adhesion. Examples of substrates with such lower surface tension are oriented polypropylene (OPP) and polystyrene films having a surface tension of around 42 dynes/cm, high density polyethylene film (HDPE film) and high density polyethylene coated paper (HDPE coated paper) having both a surface tension of around 36 dynes/cm. Surprisingly, it was found that with the inventive adhesive such substrates with a low surface tension can be bonded without further formulating work to form a good bond. Even a water-based adhesive with a weight-ratio of water-redispersible polymer powder to water-soluble polymer powder from about 0.5:1 to 100:1, preferably from about 1.0:1 to 100:1, more preferably from about 2.0:1 to 100:1, and in particular from about 3.0:1 to 100:1, at a typical solids content of about 40 wt.-%, has the capability to bond a substrate with a low surface tension to a cellulosic substrate, which is in particular paper. The substrate with the low surface tension has a surface tension of 42 dynes/cm or lower, in particular of 38 dynes/cm and preferably 36 dynes/cm or lower, whereas the surface tension is determined according to ASTM D2578 standard.

One preferred embodiment is that the water-based adhesive for industrial applications has low levels of Volatile Organic Compounds (VOC), thus being environmentally friendly. VOC's have a boiling point at ambient pressure of 250° C., thus most plasticizer, defoamer, residual monomers of the water-redispersible polymer powder and the synthetic water-soluble powder as well as solvents being used in the manufacturing process of water-soluble polymer powders are considered as such. Preferred VOC-levels are below 1000 ppm, preferably below 500 ppm, most preferably below 200 ppm and in particular below 50 ppm.

Another preferred embodiment is that the water-based adhesive for industrial applications has low levels of plasticizer and/or low levels of biocide and/or preservatives. When selecting a water-redispersible polymer powder with enhanced film-formation properties, the plasticizers can be reduced to about 1 wt.-% or lower, based on the solids level, preferably 0.5 wt.-% or lower and in particular it can be omitted completely. Since powders are much less susceptible to microbiological attack, compared to liquid adhesives, the inventive water-based adhesives need to have a shelf life of typically just a view days or even less, also the biocide level can be reduced to 0.1 wt. % or lower, preferably 0.01 wt-% or lower and in particular the inventive water-based adhesives are even free of biocides and/or preservatives.

For certain applications it is very beneficial to apply the water-based adhesive in foamed state. They may be foamed by either introducing actively a gas or a gas mixture into the adhesive by means known in the art such as, but not limited to, chemical and/or mechanical means, such as mechanical stirring or agitation incorporating a gas or a gas mixture during the re-dispersion step into the adhesive. The preferred gas is nitrogen and the preferred gas mixture is air. The water-based adhesive may or may not contain an air entraining and/or an air stabilization agent to stabilize the entrained gas. The density, measured at 23° C., of such foamed adhesives preferably ranges from about 1.200 to 0.010 g/cm$^3$, more preferably from about 1.10 to 0.10 g/cm$^3$, most preferably from about 1.0 to 0.40 g/cm$^3$, and in particular from about 0.95 to 0.50 g/cm$^3$.

It is well possible that further components are added to the water-based adhesive for industrial applications, either as a single additive or as a combination of various components. They can be either in liquid or in solid state and can be water-soluble or water-insoluble. Non-limiting examples include nonionic, anionic, cationic or amphoteric surfactant or mixtures thereof at levels up to about 10 wt.-% or more, in particular up to about 5 wt.-%, based on the water-based adhesive. Further other components can be wetting agents, adhesion promoters, foam generators, defoamers, rheology modifiers, plasticizer, coalescing agents, biocides, preservatives, dyes, pigments, fragrances, tackifiers, waxes, UV indicators, humectants, pH-adjusters and/or buffers, hardeners such as acidic metal salts such as $AlCl_3$, $FeCl_3$, $Cr(NO_3)_3$, crosslinkers such as polyisocyanates, boric acid and/or their salts or formaldehyde-urea resins and formaldehyde-phenol resins, liquid adhesives, in particular water borne adhesives based on water-soluble adhesives as well as water-dispersible adhesives, which typically are latex-based, fillers and anticaking agents such as carbonates, clays, silicates, hydrophobic and hydrophilic silica, pyrogenic or precipitated silicic acid, microsilica, kaolin, talc, magnesium hydrosilicate, light spar, polysaccharides such as starches, mica, nut shell flours, and wood flour. Preferred fillers are calcium carbonates, clays and silica. Other components commonly used in the art can be added as well. They can be added to just one of the powders or to both types of powders and/or their manufacturing. Additionally, or alternatively, they can be added either before, during or after the redispersion and/or dissolution step of the powders. Total amounts of such additives range preferably from about 0.1 to 500 wt.-% and more, more particular between about 0.2 and 250 wt.-%, and preferably between about 0.5 and 100 wt.-%, based on the amount of sum of the water-redispersible polymer powder and the water-soluble polymeric powder.

The process to make the inventive water-based adhesive for industrial applications is very versatile. One embodiment is that the water-redispersible and the water-soluble polymer powders are mixed as powders before mixing with water. This has the advantage that only one raw material needs to be handled. This combined powder mixture can then be mixed with water to obtain the inventive adhesive. Another embodiment is, that one of the powders are mixed with water first and the other powder can be mixed-in later on. This can occur right away, e.g. in the same plant in consecutive steps, or it also can be done e.g. in different site. Thus, such a powder-water-mix can be made at one company and sold on as a liquid solution or redispersion, whereas the other powder is mixed-in later on at the customers site. A further embodiment is, that both powders are mixed with water separately, and the aqueous mixtures are combined to the inventive adhesive. This is less preferred when the water amount needs to be as low as possible, but otherwise it can be beneficial regarding the logistical matters. Even a further embodiment is, that both powders added at the same time, whereas the water can be added at the same time or up front. Although handling two separate powders adds complexity to supply chain, it can be a big advantage, since a large number of different water-based adhesives can be made just by varying the ratio of the two powders. By choosing different solids contents, and optionally more or less foam which can be incorporated easily, an even bigger number of adhesive grades with very different properties can be made just with two powders and water.

The mixing of one or both powders can be carried out using batch-, micro-batch, semi-batch and/or continuous mixing procedures. If one powder is mixed, the other powder can be already part of the aqueous phase. For batch-type mixing, where all raw materials are added within a short period of time, typically larger containers are used as mixing vessel, e.g. from 10 litre up to 30 m$^3$ or more, but e.g. 100 litre to 10 m$^3$ is typically preferred. Micro-batch mixing is a sort of continuous mixing with small batch cycles or charging the chamber with raw material, mixing with water, which can be in parallel to the micro-batch, followed by discharging the chamber. Volumes of such chambers are typically small, e.g. just some cm$^3$, up to a view hundred litres. However, for typical industrial applications, volumes of about 100 cm$^3$ to about 100 litres are preferred. This process is particularly preferred when relatively small amounts of adhesives shall be produced continuously to avoid e.g. big product loss upon a standstill of the plant. In a semi-batch process is often one powder dissolved first, and the second powder is added lateron within a specific time period. The mixing vessels are generally comparable in size with the ones used for batch-type mixing. This method is particularly preferred when such mixers are already installed and/or when one powder, typically the water-soluble powder, needs elevated temperatures to dissolve.

For dissolving and/or redispersing the polymer powders it can be helpful if a certain mixing energy, which can be quite high. This depends strongly on the type of powders as well as their grain size. If powders with smaller particles are used, less energy is typically required. However, it also depends on the type and amount of intermolecular bonds certain products have. As a general rule, but not as a requirement, the mixing shall be as strong that a vortex can be observed and typical speed of mixing, which again depends strongly on the size of vessel and the type of mixing element, is about 100 to 5000 rpm, more typically between 500 and 2000 rpm. Regarding the mixing elements, there is again no requirement, as long as a proper solution and redispersion is obtained. However, in many cases are propeller stirrer, e.g. jacket-propellers and/or dissolver discs are preferred.

Typically, the substrates are bonded together by a process wherein the inventive water-based adhesive is applied to at least a first substrate, a second substrate is brought in contact with the adhesive composition applied to the first substrate, and the applied adhesive is optionally subjected to conditions which will allow the adhesive composition to form a set bond, such conditions including air, heat and/or pressure.

The inventive water-based adhesives for industrial applications can be used in all type of industrial adhesive applications. Non-limiting examples include paper converting applications, in particular tubes and core winding, edge banding and edge profiling, sleeves manufacturing, litho solid board and solid fibre lamination, honeycomb, in particular network construction and cover sheet lamination, bag handles, bags & sacks, in particular multi walls industrial sacks, envelopes and pockets, in particular remoistenable front flap, back seam and window patch, file manufacturing and book binding, in particular casing in and spine, stamps, remoistenable coatings, tissue and towel in particular pick up, tail seal and ply bonding applications, lumber and wood applications, structurally insulated panels, bottle labelling, glued lap, folding carton, composites boxes, corrugating, tissue & towel, packaging applications, in particular as sift proofing, composite cans and labelling, tobacco applications, in particular as tipping, side seam, filter making and packaging, flexible laminating and packaging application and in medical and electronic applications.

Due to the big number of different applications, there is also a big variety of various machines. However, it was found that the inventive adhesive can be used with all different types of machines without any restrictions. Thus, it can be used on machines with jet nozzle, cascade or roller-type machines, whereas the rollers can be made out of brass, inox, aluminium, rubber and/or ceramic materials, and/or engraved steel rollers, plain-steel rollers, and/or multi-shear cylinder rollers, or machines using a stencil to apply the adhesive, whereas the stencil can be made out of brass, rubber, plastic, polymers, or foamed plastic.

There is also no restriction regarding the machine speed on which the adhesive is being used. While low machine speeds is generally not problematic, high machine speeds often lead to problems with liquid adhesives, thus, limiting the speed of the machine below its technical capabilities. It was now found that the inventive adhesive does give no or clearly less restrictions, thus machines can often run faster than with the state-of-the art adhesives, which makes the use of the machines much more cost effective. Thus, the adhesive can be typically applied in litho lamination at e.g. 180 min/min or higher, and in tobacco applications at e.g. 1000 to 1500 m/min or higher.

This invention is illustrated by the following non-limiting examples. General procedures are given below.

Determination of the Set Speed:

White lined chipboard, supplied by Hedsor, is used with a thickness of 385 μm and a weight of 275+/3 g/m$^2$ and Cobb values of 43 g/min/m$^2$ (grey side) and 27 g/min/m$^2$ (white non-porous side). Two strips of boards were bonded together (grey porous side to white non-porous side) at controlled temperature of 23° C., using a controlled amount of adhesive, applied with a metered K-bar 4, giving a wet adhesive thickness of 36 μm, followed by applying an even pressure with the weight of a K-bar 2. The timer is immediately started and the two strips of board are slowly pulled apart. The time of extensive fibre tear is recorded as the set speed. The set speed varies with different adhesive coat weight (higher thickness leads to a longer set speed), different water absorbency (higher absorbency gives faster set speed) as well as different temperature and relative humidity (higher temperature and lower relative humidity lead to faster set speed).

Determination of the Adhesion:

All adhesives were applied on the relevant high surface tension substrate in a 36 μm thick wet adhesive layer using a suitable applicator. Immediately afterwards, the second substrate, if applicable with the lower surface tension, was laid on the applied adhesive, followed by applying pressure by using a 2 kg roller once in each direction. The samples were all cut into 25 mm wide substrates and left to dry overnight at room temperature and 50% relative humidity before determining the adhesion force using an Instron test machine at a speed of 300 mm/min.

EXAMPLE 1

For the preparation of the reference adhesive Ref 1, a total of 252 g of water was measured in a 400 ml plastic pot and stirred at 600-700 rpm using a standard lab mixer equipped with a 55 mm wide stirring blade. 48 g of Starch powder (Solvicol GP 45 Plus* from Avebe) was added slowly at steady rate to the vortex of water. After the completion of the powder addition, the mixture was stirred for a total of one hour.

For making the adhesives Adh 1a and 1b, the above procedure was repeated, whereas only 244.5 g of water were used. Five minutes after the completion of the starch addition, the water-redispersible polymer powder (7.5 g) was added slowly. No lump and no grit formation was observed.

TABLE 1

Set speed, tack and machine speed using a pure water-soluble polymer powder (Ref 1) based adhesive to bond Kraft paper to Kraft paper, in comparison with the use of Adh 1a and Adh 1b, both prepared from a water-soluble polymer powder and a small amount of water-redispersible polymer powder.

|  | Ref 1 | Adh 1a | Adh 1b |
|---|---|---|---|
| Water [parts] | 84 | 81.5 | 81.5 |
| WSPP [parts] [a] | 16 | 16 | 16 |
| WRPP [parts] [b] | — | 2.5 [c] | 2.5 [d] |
| Solids [wt.-%] [e] | 13.7 | 16.4 | 16.5 |
| Viscosity [mPas] [f] | 2,120 | 2470 | 2240 |
| Viscosity [sec] [g] | 52 | 64 | 59 |
| Set Speed [sec] [h] | 182 | 51 | 52 |
| Tack [Finger test] [i] | Standard | Higher & longer | Higher & longer |
| Machine Speed [bags/min] [j] | 240 | 300 | 300 |

[a] The water-soluble polymer powder (WSPP) is a cold water soluble, pregelatinized and hydrolysed potato starch (Solvicol GP 45 Plus* from Avebe).
[b] WRPP stands for water-redispersible polymer powder.
[c] The WRPP is a low-VOC polyvinyl acetate homopolymer (PVAc).
[d] The WRPP is a low-VOC ethylene - vinyl acetate copolymer (EVA-1).
[e] The solids content was determined at 105° C. using a ventilated oven. For Ref 1 it is lower than calculated, which is attributed to the moisture content of the starch powder.
[f] The Brookfield viscosity was determined according to ASTM D1084 standard, measured at 20 rpm and 23° C.
[g] The Ford cup viscosity was measured according to EN ISO 2431 with Ford cup No. 6 at 23° C.
[h] The set speeds are averaged over 3 measurements on Kraft to Kraft paper using a 100 micron sheen cube with a 50 μm thick adhesive layer. For detailed procedure see above.
[i] The tack test was carried out by coating 2 adhesives on A4 paper using a standard K-bar and then using a finger to compare the tack of both adhesives at various times.
[j] Larger adhesive quantities were made up accordingly and applied on a roller-type machine.

The results show clearly that just by adding a small amount of water-redispersible polymer powder to a commercially used adhesive, which is based on a water-soluble polymer powder only, has very little impact on the adhesive properties such as Brookfield and Ford Cup viscosities, which is essential when changing an adhesive grade but has a very significant impact on the set speed, which becomes much faster, and the tack, which increases and therefore holds substrates together better whilst drying, thus allowing to run the machines by 25% faster. No negative effects were observed, such as splashing or grits. This reduces machine-related costs per bag significantly, which outweighs the slightly increased adhesive costs.

EXAMPLE 2

The preparation of the reference adhesive Ref 2 was in analogy to Adh 1a and 1b, but using the amounts referred to in Table 2 and the liquid adhesive (Forbo Ulitex 34785) instead of a water-redispersible polymer powder.

The adhesives Adh 2a, 2b and 2c were prepared in analogy to Adh 1a and 1b, but using the amounts referred to in Table 2. No lump and no grit formation was observed.

TABLE 2

Adhesion of Kraft paper bonded to polyethylene coated paper having a surface tension of 36 dynes/cm, using a commercial adhesive (Ref 2) based on water soluble polymer powder and a liquid emulsion adhesive in comparison with Adh 2a to Adh 2c, in which the liquid adhesive was replaced by a water redispersible polymer powder (same solids content).

|  | Ref 2 | Adh 2a | Adh 2b | Adh 2c |
|---|---|---|---|---|
| Water [parts] | 59.0 | 64.5 | 64.5 | 64.5 |
| WSPP [parts] [a] | 15.0 | 15.0 | 15.0 | 15.0 |
| Adhesive [parts] [b] | 10.0 | — | — | — |
| WRPP [parts] [c] | — | 4.5 [d] | 4.5 [e] | 4.5 [f] |
| Solids [wt.-%] [g] | 22.1 | 22.1 | 22.4 | 22.0 |
| Viscosity [mPas] [h] | 4,290 | 4,470 | 3,490 | 4,250 |
| Adhesion [N/mm] [i] | 0.57 [k] | 4.29 [m] | 2.36 [m] | 4.08 [n] |
|  | 1.17 [k] | 2.70 [m] | 1.63 [o] | 3.92 [n] |
|  | 0.97 [k] | 3.38 [m] | 3.20 [m] | 2.89 [m] |
|  | Delam. [l] | 3.36 [n] | 4.54 [n] | 4.00 [n] |
|  | Delam. [l] | 5.27 [n] | 4.42 [n] | 2.35 [n] |
|  | Delam. [l] | 1.82 [o] | 4.59 [n] | 3.39 [n] |
| Average Adh. [N/mm] [j] | <0.91 | 3.47 | 3.46 | 3.44 |

[a] The water-soluble polymer powder (WSPP) is a cold water soluble, pregelatinized and hydrolysed potato starch (Solvicol GP 45 Plus* from Avebe).
[b] The liquid emulsion adhesive is a commercial, polymer dispersion-based adhesive grade with a solids content of 44 wt.-%, containing 0.1 wt.-% organic solvents (Forbo Ulitex 34785).
[c] WRPP stands for water-redispersible polymer powder.
[d] The water-redispersible polymer powder (WRPP) is a low-VOC polyvinyl acetate homopolymer (PVAc).
[e] The water-redispersible polymer powder (WRPP) is a low-VOC ethylene - vinyl acetate copolymer (EVA-1).
[f] The water-redispersible polymer powder (WRPP) is a low-VOC ethylene - vinyl acetate copolymer (EVA-2).
[g] For solids content see footnote e) of table 1.
[h] For Brookfield viscosity see footnote f) of table 1.
[i] For the detailed procedure to measure adhesion, see above.
[j] Average adhesion values of values cited under i).
[k] Adhesion failure (insufficient bonding).
[l] The sample delaminated by itself when dry.
[m] Fibre Picking (limited adhesion).
[n] Fibre Tear (preferred).
[o] Low adhesion due to poor bond (preparation anomalies, e.g. poor coating or bubbles).

The reference adhesive Ref 2, which is a commercially used adhesive mixture, does show strong limitations to bond Kraft paper (surface tension of >48 dynes/cm) to polyethylene coated paper (surface tension of 36 dynes/cm), thus being not suitable at all. However, by replacing the liquid emulsion adhesive by the same solids amount of a water-redispersible polymer powder, the obtained adhesive again shows about the same Brookfield viscosities as the original prepared adhesive, which is important for the applicability, but significant improved adhesion of Kraft paper to polyethylene coated paper, which is clearly a difficult to bond substrate. Furthermore, the used water-redispersible polymer powders do not contain organic solvents. Thus, these organic volatiles can be eliminated completely, making the resulting adhesive a much more environmentally friendly product. Furthermore, the proper preparation of Adh 2a to 2c does not lead to grit or clump formation, which is often observed when mixing a liquid emulsion adhesive into an aqueous starch solution.

EXAMPLE 3

The reference adhesive Ref 3a is a commercial adhesive and applied as such. The adhesives Ref 3b and 3c are water-based emulsion polymers adjusted to the mentioned solids and viscosities, see footnotes b) and c) of Table 3 for details. The adhesives Adh 3a and 3b were prepared in analogy of Adh 1a and 1b, using the relative amounts given in Table 3.

TABLE 3

Adhesion values of high density polyethylene (HDPE) foil having a surface tension of 36 dynes/cm to Kraft paper bonded with a commercial high performance aqueous dispersion-based adhesive grade in comparison with synthetic polymer dispersions as well as a mixture of water-soluble polymer powder (starch) and water-redispersible polymer powder.

|  | Ref 3a[a)] | Ref 3b[b)] | Ref 3c[c)] | Adh 3a | Adh 3b |
|---|---|---|---|---|---|
| Water [parts] | — | — | — | 59 | 59 |
| WSPP [parts][d)] | — | — | — | 10 | 10 |
| WRPP [parts][e)] | — | — | — | 38[f)] | 41[g)] |
| Solids [wt.-%][h)] | 55.0 | 47.4 | 50.3 | 38.3 | 40.6 |
| Viscosity [mPas][i)] | 2,180 | 1780 | 2240 | 15,540 | 2,020 |
| Viscosity [sec][j)] | 72 | 87 | 56 | Pasty | 80 |
| Adhesion [N/mm][k)] | 2.52 | 1.55 | 2.3 | 2.38 | 2.34 |
| Adhesion [N/mm][l)] | 3.07 | 1.83 | 1.84 | 2.73 | 2.38 |

[a)] Ref 3a is National 133-299a, which is a commercial high performing aqueous dispersion-based adhesive grade to bond HDPE substrates to cellulosic substrates such as paper.
[b)] Ref 3b is based on Vinamul 3254 (EVA polymer dispersion), which was adjusted with water to solids of about 47 to 50 wt.-% and with thickener (0.2 wt.-% of Viscalex AT 88 on total weight) to a viscosity of about 1700 to 2300 mPas.
[c)] Ref 3c is based on Vinamul 3171 (EVA polymer dispersion), which was adjusted with water to solids of about 47 to 50 wt.-% and with thickener (0.32 wt.-% of Viscalex AT 88 on total weight) to a viscosity of about 1700 to 2300 mPas.
[d)] The water-soluble polymer powder (WSPP) is a cold water soluble, pregelatinized and hydrolysed potato starch (Solvicol GP 45 Plus* from Avebe).
[e)] WRPP stands for water-redispersible polymer powder.
[f)] The water-redispersible polymer powder (WRPP) is a low-VOC polyvinyl acetate homopolymer (PVAc).
[g)] The water-redispersible polymer powder (WRPP) is a low-VOC ethylene-vinyl acetate copolymer (EVA-1).
[h)] For solids content see footnote e) of table 1.
[i)] For Brookfield viscosity see footnote f) of table 1.
[j)] For Ford cup viscosity see footnote g) of table 1.
[k)] Adhesion force measured on outer Kraft paper to 12 μm thick HDPE foil.
[l)] Adhesion force measured on inner Kraft paper to 12 μm thick HDPE foil.

The high performance grade Ref 3a does show superior adhesion of both, inner and outer Kraft paper on HDPE foil, which is a very difficult to bond substrate, having a low surface tension of 36 dynes/cm. This is further demonstrated, that polymer dispersions, being principally suitable for formulating adhesives for such substrates, cannot compete at all with Ref 3a. Hence, it was surprisingly found that the combination of water-soluble polymer powder with a water-redispersible polymer powder give nearly as good adhesion values as the high performance, liquid grade, which is in most cases sufficient, although some water-redispersible powders are less suitable due to high viscosity build-up. Furthermore, it needs to be noted, that by using Adh 3a and 3b, about 30% less adhesive is being used due to the lower solids content, compared to Ref 3a. Additionally, the Adh 3a and 3b did run very clean on the machines. This is in contrast to typical dispersion based adhesives, which require more down time. These factors, together with the different raw materials, lead to significant cost benefits, as well as to logistical advantages such as longer shelf life, lower biocide levels and no empty container disposal of the liquid adhesive, since the bags containing the powder polymers can be disposed off easily.

EXAMPLE 4

For the preparation of the reference adhesive Ref 4, a total of 270 g of water was measured in a 400 ml stainless steel container and stirred at 600-700 rpm/min using a standard lab mixer equipped with a 55 mm wide stirring blade. 30 g of polyvinyl alcohol powder (Kurraray PVA 17-99) was added slowly at steady rate to the vortex of water and mixed for 15 minutes. The sample was afterwards heated to 90° C. for one hour, followed by cooling to below 60° C.

The adhesives Adh 4a to Adh 4d were prepared in analogy to reference adhesive Ref 4, using the type and amounts of raw materials given in Table 4. When the temperature of the polyvinyl alcohol solution was below 60° C., the water-redispersible polymer powder was added slowly, followed by a further mixing time of 20 min.

TABLE 4

Set speed and machine speed using a pure water-soluble polymer powder based adhesive (polyvinyl alcohol, Ref 4), commercially used in U- and L-profiling by bonding paper to Duplex board (250 micron), in comparison with the use of Adh 4a to Adh 4d, which are all prepared using water-soluble polymer powder and water-redispersible polymer powder.

|  | Ref 4 | Adh 4a | Adh 4b | Adh 4c | Adh 4d |
|---|---|---|---|---|---|
| Water [parts] | 90 | 88.4 | 88.4 | 85.2 | 82.0 |
| WSPP [parts][a)] | 10 | 9.6 | 9.6 | 8.8 | 8.0 |
| WRPP [parts][b)] | — | 2.0[c)] | 2.0[d)] | 6.0[d)] | 10.0[d)] |
| Viscosity [mPas][e)] | 1100 | 1200 | 1120 | 1140 | 1230 |
| Viscosity [sec][f)] | 52 | 55 | 55 | 48 | 48 |
| Solids [wt.-%][g)] | 9.5 | 11.0 | 11.0 | 14.5 | 18.0 |
| Set Speed [sec][h)] | 167 | 157 | 125 | 109 | 94 |
| Machine speed [m/min][i)] | 12 | 28 | 28 | N/A | N/A |

[a)] The water-soluble polymer powder (WSPP) is Polyvinyl alcohol PVA 17-99 from Kurraray, having a degree of hydrolysis of 99 Mol-% and a Hoppler viscosity as 4 wt.-% aqueous solution of 17 mPas.
[b)] The water-redispersible polymer powder (WRPP) was first redispersed in water (50 wt.-%) and added as such.
[c)] The WRPP used is a low-VOC polyvinyl acetate homopolymer (PVAc).
[d)] The WRPP is a low-VOC ethylene-vinyl acetate copolymer (EVA-1).
[e)] For Brookfield viscosity see footnote f) of table 1.
[f)] For Ford cup viscosity see footnote g) of table 1.
[g)] For solids content see footnote e) of table 1.
[h)] set speed measured on white lined chipboard supplied by Hedsor as defined in the procedure defining the set speed.
[i)] Larger adhesive quantities were made up accordingly and applied on a cascade-type machine.
N/A stands for not measured.

The commercially used water-based adhesive Ref 4 is based on polyvinyl alcohol, available as synthetic polymer powder. The relatively long set speed, the low solids content, which is required to get the required viscosity, but also the nature of the polymer used, lead to a fairly slow machine speed. By adding to the polyvinyl alcohol solution some water-redispersible polymer powder, the solids content increases, as well as the set speed decreases, which also depends on the polymer type of the latter. However, the viscosities remain at about constant value, which is essential to run the machine properly. Hence, these small changes allowed increasing the machine speed significantly by more than 100%, which is still an unoptimised level. No splashing as well as no signs for grit formation was observed.

The invention claimed is:

1. A water-based adhesive for industrial applications comprising an aqueous mixture of a water-redispersible polymer powder, a water-soluble polymer powder and optional components;
   wherein the water-redispersible polymer powder is a water insoluble, film-forming polymer based on at least one monomer selected from the group consisting of vinyl esters of C1- to C20-carboxylic acids, ethylene, vinylchloride, C1- to C20-alkyl esters of acrylic acid and methacrylic acid, acrylonitrile, (meth) acrylamide, styrene, styrene derivatives and butadiene;
   wherein the weight ratio of the water-redispersible polymer powder to the water-soluble polymer powder is from about 0.001:1 to 100:1; and
   wherein the water-based adhesive (i) has a set speed of less than 300 sec, when measured with a 36 μm thick layer at 23° C. and 50% relative humidity and 385 μm thick carton boards with a weight of 275+/−3 g/m$^2$; (ii) has a Cobb values on one side of 43 g/min/m$^2$ and 27 g/min/m on the other side; (iii) has a solids content of about 7.5 to 70 wt.-% ; and (iv) has a Brookfield viscosity of about 500 to 10,000 mPas at 23° C. at 20 rpm, measured according to the ASTM D1084 standard.

2. The water-based adhesive according to claim 1, wherein the water-soluble polymer powder is a synthetic polymer powder, or a modified or unmodified natural polymer powder.

3. The water-based adhesive according to claim 2, wherein the water-based adhesive has a solids content of about 10 to 65 wt.-% , and a Brookfield viscosity of about 1000 to 7500 mPas at 23° C. and 20 rpm, measured according to the ASTM D1084 standard and wherein the weight ratio of water-redispersible polymer powder to water-soluble polymer powder is about 0.01:1 to 50:1.

4. The water-based adhesive according to claim 2, wherein the water-based adhesive has a set speed and open time at 23° C. and 50% relative humidity of less than 200 sec.

5. The water-based adhesive according to claim 2, wherein the water-based adhesive has a level of grits, which have a mean particle size greater than 50 μm, lower than 10 ppm.

6. The water-based adhesive according to claim 2, wherein the water-based adhesive is bonded to two substrates, wherein one substrate is a low surface tension substrate and the second substrate is a cellulosic substrate.

7. The water-based adhesive according to claim 6, wherein the surface tension substrate has a surface tension of 42 dynes/cm or lower.

8. The water-based adhesive according to claim 2, wherein the water-based adhesive has a VOC content, of below about 1000 ppm, is plasticizer free and/or has a biocide level of below about 0.1 wt %.

9. The water-based adhesive according to claim 2, wherein the water-based adhesive contains a gas or gas mixture and the water-based adhesive has a density of about 0.010 to 1.20 g/cm$^3$ at 23° C.

10. The water-based adhesive according to claim 2, wherein the optional components are selected from the group consisting of plasticizers, defoamers, wetting agents, adhesion promoters, foam generators, hardeners, waxes, surfactants, rheology modifiers, fragrances, dyes, pigments, preservatives, UV-indicators, coalescing agents, humectants, tackifiers, boric acid or their salts, pH-adjusters and/or buffers, water borne adhesives, organic fillers and inorganic fillers.

* * * * *